United States Patent
Capelot et al.

(10) Patent No.: US 11,813,828 B2
(45) Date of Patent: Nov. 14, 2023

(54) BARRIER STRUCTURE MADE FROM BACT/XT COPOLYAMIDE WITH A HIGH TG

(71) Applicant: Arkema France, Colombes (FR)

(72) Inventors: Mathieu Capelot, Bernay (FR); Nicolas Dufaure, Bernay (FR); Thierry Briffaud, Bernay (FR)

(73) Assignee: ARKEMA FRANCE, Colombes (FR)

( * ) Notice: Subject to any disclaimer, the term of this patent is extended or adjusted under 35 U.S.C. 154(b) by 168 days.

(21) Appl. No.: 16/316,361

(22) PCT Filed: Jul. 10, 2017

(86) PCT No.: PCT/FR2017/051871
§ 371 (c)(1),
(2) Date: Jan. 9, 2019

(87) PCT Pub. No.: WO2018/011493
PCT Pub. Date: Jan. 18, 2018

(65) Prior Publication Data
US 2019/0232628 A1    Aug. 1, 2019

(30) Foreign Application Priority Data
Jul. 11, 2016 (FR) ...................... 16 56623

(51) Int. Cl.
| | | |
|---|---|---|
| *B32B 27/34* | (2006.01) | |
| *C08G 69/26* | (2006.01) | |
| *B32B 1/08* | (2006.01) | |
| *B32B 27/30* | (2006.01) | |
| *B32B 27/18* | (2006.01) | |
| *B32B 27/20* | (2006.01) | |
| *B32B 7/12* | (2006.01) | |
| *B32B 27/08* | (2006.01) | |

(52) U.S. Cl.
CPC ............ *B32B 27/34* (2013.01); *B32B 1/08* (2013.01); *B32B 7/12* (2013.01); *B32B 27/08* (2013.01); *B32B 27/18* (2013.01); *B32B 27/20* (2013.01); *B32B 27/306* (2013.01); *C08G 69/265* (2013.01); *B32B 2250/24* (2013.01); *B32B 2262/02* (2013.01); *B32B 2262/0261* (2013.01); *B32B 2262/0269* (2013.01); *B32B 2262/0276* (2013.01); *B32B 2262/0292* (2013.01); *B32B 2262/10* (2013.01); *B32B 2262/101* (2013.01); *B32B 2262/105* (2013.01); *B32B 2262/106* (2013.01); *B32B 2307/7242* (2013.01); *B32B 2307/7265* (2013.01); *B32B 2439/00* (2013.01); *B32B 2439/40* (2013.01); *B32B 2439/60* (2013.01); *B32B 2597/00* (2013.01); *C08G 2390/00* (2013.01)

(58) Field of Classification Search
CPC ......... B32B 27/34; B32B 27/18; B32B 27/20; B32B 7/12; B32B 27/08; B32B 2262/10; B32B 2262/0276; B32B 2262/106; B32B 2262/0269; B32B 2262/101; B32B 2262/02; B32B 2262/0292; B32B 2307/7242; B32B 2262/105; B32B 2262/0261; B32B 2250/24; B32B 2307/7265; B32B 1/08; B32B 2439/60; B32B 27/22; B32B 27/306; B32B 2307/732; B32B 2329/04; B32B 2377/00; B32B 2439/40; B32B 2597/00; B32B 7/06; B32B 2439/00; C08G 69/265; C08G 2390/00; C08K 3/017; C08K 3/04; C08K 3/08; C08K 2201/017; C08L 77/02; C08J 2377/02
See application file for complete search history.

(56) References Cited

U.S. PATENT DOCUMENTS

| | | | | |
|---|---|---|---|---|
| 3,012,994 | A * | 12/1961 | Bell ..................... | C08G 69/26 528/346 |
| 3,875,120 | A | 4/1975 | Brinkmann et al. | |
| 5,227,255 | A * | 7/1993 | Akao ..................... | B32B 27/08 428/476.1 |
| 7,927,710 | B2 | 4/2011 | Hewel | |

(Continued)

FOREIGN PATENT DOCUMENTS

| | | |
|---|---|---|
| CA | 2 564 759 | 11/2013 |
| DE | 2 256 214 | 5/1974 |

(Continued)

OTHER PUBLICATIONS

First Office Action—Arkema France—Patent 201780043211.5—dated Jan. 6, 2021.
Practical Technology and Application Plastic Modification pp. 267-268, Undated.
Practical Technology and Application Plastic Modification pp. 267-268. English translation. Undated.
Office Action (Notice of Reasons for Refusal) dated May 27, 2021, by the Japanese Patent Office in corresponding Japanese Patent Application No. 2019-500835, and an English Translation of the Office Action. (8 pages).

(Continued)

*Primary Examiner* — John D Freeman
(74) *Attorney, Agent, or Firm* — Boone IP Law

(57) ABSTRACT

The invention relates to a structure comprising at least one layer (1) comprising a BACT/XT copolyamide in which:
—BACT is a unit with an amide moiety having a molar ratio of between 20 and 70%, preferably between 25 and 60%, and more preferably between 35 and 55%, where BAC is chosen from 1,3-bis (aminomethyl) cyclohexyl (1,3 BAC), 1,4-bis (aminomethyl) cyclohexyl (1,4 BAC) and a mixture of same, and T is terephthalic acid, —XT is a unit with an amide moiety having a molar ratio of between 30 and 80%, preferably between 40 and 75%, and more preferably between 45 and 65%, where X is a C9 to C18, preferably C9, C10, C11 and C12, linear aliphatic diamine, and where T is terephthalic acid, preferably a C10, C11 and C12 terephthalic acid.

33 Claims, No Drawings

(56) References Cited

U.S. PATENT DOCUMENTS

| | | |
|---|---|---|
| 9,752,029 B2 | 9/2017 | Briffaud et al. |
| 10,040,938 B2 | 8/2018 | Nitsche et al. |
| 2005/0131147 A1* | 6/2005 | Brule ............... C08L 77/06 525/178 |
| 2008/0193691 A1* | 8/2008 | Bussi ............... B32B 27/08 428/36.9 |
| 2009/0098325 A1 | 4/2009 | Uchida et al. |
| 2013/0303367 A1* | 11/2013 | Oda ............... C08K 5/098 502/402 |
| 2014/0127440 A1 | 5/2014 | Norfolk et al. |
| 2015/0267050 A1 | 9/2015 | Briffaud et al. |
| 2018/0251601 A1 | 9/2018 | Capelot et al. |
| 2018/0346666 A1 | 12/2018 | Capelot et al. |
| 2019/0040198 A1 | 2/2019 | Capelot et al. |

FOREIGN PATENT DOCUMENTS

| | | |
|---|---|---|
| DE | 2256214 A1 | 5/1974 |
| GB | 1 383 757 | 2/1975 |
| JP | 2010-285553 A | 12/2010 |
| JP | 2015059221 A | 3/2015 |
| JP | 2015533908 A | 11/2015 |
| JP | 2018531296 A | 10/2018 |
| JP | 2018531297 A | 10/2018 |
| JP | 2018538174 A | 12/2018 |
| WO | WO 01/05786 A2 | 1/2001 |

OTHER PUBLICATIONS

Office Action (Notice of Reasons for Refusal) dated Jan. 14, 2022, by the Japanese Patent Office in corresponding Japanese Patent Application No. 2019-500835, and an English Translation of the Office Action. (4 pages).

* cited by examiner

BARRIER STRUCTURE MADE FROM BACT/XT COPOLYAMIDE WITH A HIGH TG

This application claims benefit, under U.S.C. § 119 or § 365 of PCT Application Number PCT/FR2017/051871, filed Jul. 10, 2017, and French Patent Application Number FR1656623, filed Jul. 11, 2016, these documents being incorporated herein by reference.

FIELD OF THE INVENTION

The present invention relates to a barrier structure containing a high Tg BAC:TAT copolyamide devoid of strengthening fibers. This structure can be either formed of a single layer of this polyphthalamide or comprise one layer of BACT/XT polyphthalamide and at least one layer of another material.

This barrier structure is useful for objects intended for the storage and/or transport of fluids, such as bottles, tanks, containers, tubing and vessels of all sorts. This structure can also be in the form of films with which for example packagings are made that require barrier properties for fluids such as gases. All these objects have good barrier properties, i.e. very low permeability to fluids, in particular automotive fluids, particularly to fuels.

The invention also relates to the use of a high Tg BACT/XT copolyamide for the manufacture of a structure, in particular a multilayer structure, comprising at least one barrier layer comprising said BACT/XT copolyamide.

The invention also relates to the use of these structures and of these objects.

THE PRIOR ART AND THE TECHNICAL PROBLEM

Regardless of the fluid transported or stored in objects such as bottles, tanks, containers, tubing and vessels of all sorts, the material in direct contact with the fluid must not be permeable to it, whether this is a liquid or a gas.

Accordingly, in the field of automobiles, and transport generally, the composition of fuels is constantly changing, in particular for ecological reasons, which means that bio-fuels are progressively arriving on the market. These fuels are more aggressive. Consequently, it is becoming indispensable to improve the quality of the thermoplastic parts in contact with these new fuels, such as tubing for gasoline transportation.

For safety reasons and to preserve the environment, automobile manufacturers impose on this tubing both mechanical characteristics like burst strength and flexibility with good shock resistance in the cold (−40° C.) and at high temperature (125° C.), and also very low permeability to hydrocarbons and to their additives, particularly alcohols like methanol and ethanol. These tubes must also have good resistance to fuels and motor lubrication oils.

Application WO 2014/064375 relates to a composition of or for a thermoplastic composite material with a semi-crystalline polyamide matrix (PA) with a glass transition temperature Tg of at least 90° C. and melting temperature Tm less than or equal to 280° C. and to mechanical or structural parts containing said material, the use of the composition of the invention for composite material parts for applications in the fields of: automotive, rail, marine, road transport, wind, sport, space and aeronautics, construction, signs and leisure.

This composition can be used for the manufacture of mechanical parts relating to applications in the automotive field, but no mention is made in this application of a structure comprising a barrier layer to a fluid, particularly a fuel. Moreover, this composition still comprises strengthening fibers.

EP 1988113 describes molding compositions containing a 10T/6T copolyamide with:
40 to 95% mol of 10T
5 to 40% of 6T.

EP 1988113 is silent on the barrier properties of structures formed of a layer of these compositions.

EP 1741553 describes a multilayer structure comprising two or more layers comprising at least one layer (a) comprising (A) an aliphatic polyamide and one layer (b) comprising a semi-aromatic polyamide comprising at least 60 mol % of aliphatic diamine having from 9 to 13 carbon atoms and at least 50 mol % of terephthalic acid, layer (b) being the inner layer.

EP 1741.553 is totally silent on the barrier properties of this structure.

EP1860134 describes a semi-aromatic polyamide resin comprising dicarboxylic acid units in which from 50 to 100 mol % of the dicarboxylic acid units are aromatic dicarboxylic acid units, and diamine units in which from 60 to 100% of the diamine units are aliphatic diamine units having from 9, to 13 carbon atoms, said semi-aromatic polyamide having a ratio of amine chain ends/acid chain ends greater than or equal to 6.

EP 1860134 exemplifies in particular 9T/9'T (or 8MT/9T) compounds and shows that the alcohol resistance is lower when said ratio is less than 6 and in particular 4 or less.

International application WO 10/015786 relates to a copolyamide having formula A/10.T, wherein:
A is chosen from a moiety obtained from an aminocarboxylic acid, a moiety obtained from a lactam and a moiety having the formula (diamine Ca).(di(cyclo) aliphatic acid Cb), with a representing the number of carbon atoms in the diamine and b representing the number of carbon atoms in the diacid, a and b each being inclusively between 4 and 36; characterized in that it has a polymolecularity index, Ip, less than or equal to 3.5, measured by gel permeation chromatography.

WO 10/015786 is totally silent on the barrier properties of this structure,

Moreover, these polyamides still need to be improved, in particular in terms of crystallinity, crystallization kinetics with a view to improving the copolyamide's temperature hold, processability or even to improve their shock resistance properties and their barrier properties.

Accordingly, a real need exists to find polyphthalamides presenting improved properties, in particular in terms of barrier properties.

BRIEF DESCRIPTION OF THE INVENTION

In a surprising manner, it has been found that these needs are met with a structure comprising at least one layer comprising a BACT/XT copolyamide, wherein:
BACT is a unit with an amide moiety present at a molar content ranging from 20 to 70%, preferably from 25 to 60%, more preferably from 35 to 55%, where BAC is chosen from among 1,3-bis(aminomethyl)cyclohexane (1,3-BAC), 1,4-bis(aminomethyl)cyclohexyl (1,4-BAC) or a mixture thereof, and T is terephthalic acid,
XT is a unit with an amide moiety present at a molar content ranging from 30 to 80%, preferably from 40 to 75%, more preferably from 45 to 65%, where X is a C9 to C18 linear aliphatic diamine, preferably C9, C10, C11 or C12, and where T is terephthalic acid, preferably C10, C11 or C12.

in the BACT and/or XT units, independently of each other, up to 30 mol %, preferably 20 mol %, particularly up to 10 mol % of terephthalic acid, relative to the total quantity of dicarboxylic acids, can be replaced by other diaromatic, dialiphatic or di(cyclo)aliphatic acids comprising 6 to 36 carbon atoms, particularly 6 to 14 carbon atoms, and in the BACT and/or XT units, independently of each other, up to 30 mol %, preferably 20 mol %, particularly up to 10 mol %, of the BAC and/or if applicable X, relative to the total diamine quantity, can be replaced by other diamines comprising from 4 to 36 carbon atoms, particularly 6 to 12 carbon atoms, and in the copolyamide, not more than 30 mol %, preferably not more than 20 mol %, preferably not more than 10 mol %, relative to the total quantity of the monomers, can be formed by lactams or aminocarboxylic acids, and provided that the sum of the monomers that replace terephthalic acid, BAC and X does not exceed a concentration of 30 mol %, preferably 20 mol %, preferably 10 mol %, relative to the total quantity of the monomers used in the copolyamide, and provided that BACT and XT units are still present in said copolyamide, said layer being devoid of strengthening fibers.

Therefore it has been found that these products, originally developed for composite applications because of their compromise between high rigidity (high Tg), including when hot, good processability (relatively low Tm), also had a better than expected crystalline structure and could be used as a barrier layer, i.e. very low permeability to fluids, in particular to automotive fluids, particularly to fuels, in a structure, in particular a multilayer structure, for fluid transport, although the ratio of amine chain ends/acid chain ends is particularly less than 5.

The structure of the invention can be either formed of a single layer of this polyamide or comprise one layer comprising the BACT/XT polyamide and at least one layer of another material.

In the structure of the invention the layer comprising the BACT/XT polyamide can also comprise other polymers. As an example of these other polymers mention may be made of polyamides, PPS, PPO, polycarbonate, ABS.

The invention also relates to the use of a high Tg BACT/XT copolyamide for the manufacture of a structure, in particular a multilayer structure, comprising at least one barrier layer comprising said BACT/XT copolyamide.

The invention also relates to bottles, tanks, containers, tubing and vessels of all types made with the previous structure. This structure can also be in the form of films with which for example packagings are made. All these objects have good barrier properties.

The invention also relates to these objects and the use of these structures and of these objects.

DETAILED DESCRIPTION OF THE INVENTION

Other characteristics, features, subjects and benefits of the present invention will appear even more clearly after reading the description and examples that follow.

According to a first feature of the invention, the invention relates to a structure comprising at least one layer comprising a BACT/XT copolyamide, wherein:

BACT is a unit with an amide moiety present at a molar content ranging from 20 to 70%, preferably from 25 to 60%, more preferably from 35 to 55%, where BAC is chosen from among 1,3-bis(aminomethyl)cyclohexane (1,3-BAC), 1,4-bis(aminomethyl)cyclohexyl (1,4-BAC) or a mixture thereof, and T is terephthalic acid, XT is a unit with an amide moiety present at a molar content ranging from 30 to 80%, preferably from 40 to 75%, more preferably from 45 to 65%, where X is a C9 to C18 linear aliphatic diamine, preferably C9, C10, C11 or C12, and where T is terephthalic acid, preferably C10, C11 or C12.

in the BACT and/or XT units, independently of each other, up to 30 mol %, preferably 20 mol %, particularly up to 10 mol % of terephthalic acid, relative to the total quantity of carboxylic diacids, can be replaced by other aromatic, aliphatic or cycloaliphatic diacids comprising 6 to 36 carbon atoms, particularly 6 to 14 carbon atoms, and in the BACT and/or XT units, independently of each other, up to 30 mol %, preferably 20 mol %, particularly up to 10 mol %, of BAC and/or if applicable X, relative to the total quantity of the diamines, can be replaced by other diamines comprising from 4 to 36 carbon atoms, particularly 6 to 12 carbon atoms, and in the copolyamide, not more than 30 mol %, preferably not more than 10 mol %, relative to the total quantity of the monomers, can be formed by lactams or aminocarboxylic acids, and provided that the sum of the monomers that replace terephthalic acid, BAC and X does not exceed a concentration of 30 mol %, preferably 10 mol %, relative to the total quantity of the monomers used in the copolyamide, and provided that BACT and XT units are still present in said copolyamide, said layer being devoid of strengthening fibers.

Advantageously, said copolyamide has a ratio: quantity of groups with amine chain ends/quantity of groups with acid chain ends <5, said quantities of groups of amine chain ends and quantity of groups with acid chain ends being determined by potentiometry.

1,3-BAC (or 1,3 bis(aminomethyl)cyclohexane, CAS No.: 2579-20-6) is a cycloaliphatic diamine monomer obtained in particular by hydrogenating meta-xylene diamine (MXDA). 1,3-BAC exists in the form of two isomers, cis and trans, where CAS No.: 2579-20-6 corresponds to a mixture of isomers.

1,4-BAC (or 1,4 bis(aminomethyl)cyclohexane, CAS No.: 2549-07-9) is a cycloaliphatic diamine monomer obtained in particular by hydrogenating para-xylene diamine (PXDA). 1,4-BAC exists in the form of two isomers, cis and trans, where CAS No.: 2549-07-9 corresponds to a mixture of isomers.

Advantageously, the 1,3-BAC or 1,4-BAC used in the BACT unit is a mixture of cis and trans isomers in respective proportions of 0/100 to 100/0, in particular from 75/25 to 25/75.

Advantageously, the proportion of cis isomer in the 1,3-BAC is greater than 60%, preferably greater than 70%, particularly greater than 80%, in particular greater than 90%.

Advantageously, the proportion of trans isomer in the 1,4-BAC is greater than 60%, preferably greater than 70%, particularly greater than 80%, in particular greater than 90%.

BAC and/or X can be replaced, independently of each other, up to 30 mol % by other diamines defined above, in particular by a linear or branched aliphatic diamine, a cycloaliphatic diamine or a arylaromatic diamine such as meta-xylene diamine (MXDA).

As an example, the linear or branched aliphatic diamine is chosen from 1,4-butanediamine, 1,5-pentanediamine, 2-methyl-1,5-pentanediamine (MPMD), 1,6-hexanedianiine, 1,8-octanediamine (OMDA), 1,9-nonanediamine (NMDA), 2-methyl-1,8-octane-diamine (MODA), 2,2,4-trimethylhexamethylenediamine (TMEIMD), 2,4,4-trimethylhexamethylenediamine (TMHMD), 5-methyl-1,9-nonanediamine, 1,11-undecanediamine, 2-butyl-2-ethyl-1,5-pentanediamine, 1,12-dodecanediamine, 1,13-tridecanediamine, 1,14-tetradecanediamine, 1,16-hexadecanediamine and 1,18-octadecanediamine.

The cycloaliphatic diamine can be chosen from isophoronediamine, norbornanedimethylamine, 4,4'-diaminodicyclohexylmethane (PACM), 2,2-(4,4'-diamino-dicyclohexyl)propane (PACP), and 3,3'-dimethyl-4,4'-diaminodicyclohexylethane (MACH).

T can be replaced up to 30 mol % by other carboxylic diacids defined above, in particular by other aromatic, aliphatic or cycloaliphatic carboxylic diacids.

The aromatic carboxylic diacids can be chosen from naphthalenedicarboxylic acid (NDA) and isophtalic acid (IPS).

The aliphatic carboxylic diacids can be chosen from adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid and dimerized fatty acids.

The cycloaliphatic carboxylic diacids can be chosen from cis- and/or trans-cyclohexane-1,4-dicarboxylic acid and/or cis- and/or trans-cyclohexane-1,3-dicarboxylic acid (CHDA).

BAC and/or X and/or T can be replaced, independently of each other, up to 30 mol % by lactams or aminocarboxylic acids.

The lactams and aminocarboxylic acids can be chosen from caprolactam α,ω-aminocaproic acid, α,ω-aminononanoic acid, α,ω-aminoundecanoic acid (AUA), lauryllactam (LL) and α,ω-aminododecanoic acid (ADA).

30 mol % maximum, relative to the total sum of the BAC, X and T monomers, of replacement, whether by another diamine, another diacid, a lactam or an aminocarboxylic acid or any mixture of these is possible.

Advantageously, 20 mol % maximum, relative to the total sum of the BAC, X and T monomers, of replacement, whether by another diamine, another diacid, a lactam or an aminocarboxylic acid or any mixture of these is possible.

Advantageously, 10 mol % maximum, relative to the total sum of the BAC, X and T monomers, of replacement, whether by another diamine, another diacid, a lactam or an aminocarboxylic acid or any mixture of these is possible.

The expression "strengthening fibers" or "fibrous strengthener" denotes an assembly of short or long fibers. The fibers can be continuous, in the form of unidirectional (UD) or multidirectional (2D, 3D) strengthening, in the form of wovens, sheets, strips or tresses and can also be cut for example in the form of non-wovens (mats) or in the form of felts.

The expression "strengthening fibers" denotes:
inorganic fibers, in particular carbon fibers, which includes fibers of nanotubes or carbon nanotubes (CNT), carbon nanofibers or graphenes; silica fibers such as glass fibers, in particular type E, R or S2; boron fibers; ceramic fibers, in particular silicon carbide fibers, boron carbide fibers, boron carbonitride fibers, silicon nitride fibers, boron nitride fibers, basalt fibers; fibers or filaments containing metals and/or their alloys; metal oxide fibers, in particular of alumina ($Al_2O_3$); metalized fibers such as metalized glass fibers and metalized carbon fibers or mixtures of previously cited fibers.

polymeric or polymer fibers, in particular:
thermohardening polymer fibers and more particularly chosen from: unsaturated polyesters, epoxy resins, vinyl esters, phenol resins, polyurethanes, cyanoacrylates and polyimides, such as bis-maleimide resins, aminoplasts resulting from the reaction of an amine such as melamine with an aldehyde such as glyoxal or formaldehyde fibers of thermoplastic polymers and more particularly chosen from: polyethylene terephthalate (PET), polybutylene terephthalate (PBT), polyimide fibers, aramid fibers (such as Kevlar®) and aromatic polyamides such as those having one of the formulas: PPDT, MPD.I, PAA and PPA, with PPD and MPD being respectively p- and m-phenylene diamine, PAA being polyarylamides and PPA being polyphthalamides fibers of polyamide block copolymers such as polyamide/polyether, fibers of polyarylether ketones (PAEK) such as polyetherether ketone (PEEK), polyetherketone ketone (PEKK), polyetherketoneetherketone ketone (PEKEKK).

or mixtures of the fibers cited above.

Consequently, all strengthening fibers and particularly those defined above are excluded from the scope of the invention.

In an advantageous embodiment, the present invention relates to a structure No. 1 to 3 defined below comprising at least one layer (1) comprising a BACT/XT copolyamide in the proportions defined in Table I below:

TABLE I

| Structure No. | BACT molar % | XT molar % |
|---|---|---|
| 1 | 20-70 | 30-80 |
| 2 | 25-60 | 40-75 |
| 3 | 35-55 | 45-65 |

Advantageously, in the structures defined above, X is a C9, C10, C11 or C12 diamine, particularly C10, C11 or C12.

In an advantageous embodiment, the present invention relates to a structure as defined above, wherein said copolyamide has a melting temperature Tm<290° C., preferably <285° C., more preferably <280° C., as determined according to standard ISO 11357-3 (2013).

In an advantageous embodiment, the present invention relates to a structure as defined above, wherein said copolyamide has a glass transition temperature Tg>120° C., preferably >130° C., more preferably >140° C., determined according to standard ISO 11357-2:2013.

Advantageously, the Tg is comprised from 125 to 165° C.

In an advantageous embodiment, the present invention relates to a structure as defined above, wherein said copolyamide has a difference between the melting temperature and the crystallization temperature Tm−Tc<40° C., preferably <30° C., determined according to standard ISO 11357-3:2013.

In an advantageous embodiment, the present invention relates to a structure as defined above, characterized in that the enthalpy of crystallization of the copolyamide, measured by differential scanning calorimetry (DSC) according to standard ISO 11357-3:2013, is greater than 40 J/g, preferably greater than 45 J/g, and even more preferably greater than 50 J/g.

In an advantageous embodiment, the present invention relates to a structure as defined above, characterized in that said copolyamide has a melting temperature: Tm<290° C. and a Tg>120° C.

In an advantageous embodiment, the present invention relates to a structure as defined above, characterized in that said copolyamide has a melting temperature: Tm<290° C. and a Tg>130° C.

In an advantageous embodiment, the present invention relates to a structure as defined above, characterized in that said copolyamide has a melting temperature: Tm<290° C. and a Tg>140° C., In an advantageous embodiment, the present invention relates to a structure as defined above, characterized in that said copolyamide has a melting temperature: Tm<285° C. and a Tg>120° C.

In an advantageous embodiment, the present invention relates to a structure as defined above, characterized in that said copolyamide has a melting temperature: Tm<285° C. and a Tg>130° C.

In an advantageous embodiment, the present invention relates to a structure as defined above, characterized in that said copolyamide has a melting temperature: Tm<285° C. and a Tg>140° C., In an advantageous embodiment, the present invention relates to a structure as defined above, characterized in that said copolyamide has a melting temperature: Tm<280° C. and a Tg>120° C.

In an advantageous embodiment, the present invention relates to a structure as defined above, characterized in that said copolyamide has a melting temperature: Tm<281° C. and a Tg 130° C.

In an advantageous embodiment, the present invention relates to a structure as defined above, characterized in that said copolyamide has a melting temperature: Tm<280° C. and a Tg>140° C.

In an advantageous embodiment, the present invention relates to a structure as defined above, characterized in that said copolyamide has the following characteristics (Table II):

TABLE II

| Structure No. | Initial structures | Tm (° C.) | Tg (° C.) | Tm − Tc (° C.) | Delta Hc (J/g) |
|---|---|---|---|---|---|
| 4 | Structures 1 to 3 | <290 | >120° C. | | |
| 5 | Structures 1 to 3 | <290 | >130° C. | | |
| 6 | Structures 1 to 3 | <290 | >140° C. | | |
| 7 | Structures 1 to 3 | <285 | >120° C. | | |
| 8 | Structures 1 to 3 | <285 | >130° C. | | |
| 9 | Structures 1 to 3 | <285 | >140° C. | | |
| 10 | Structures 1 to 3 | <280 | >120° C. | | |
| 11 | Structures 1 to 3 | <280 | >130° C. | | |
| 12 | Structures 1 to 3 | <280 | >140° C. | | |
| 13 | Structures 1 to 3 | <290 | >120° C. | <40 | |
| 14 | Structures 1 to 3 | <290 | >130° C. | <40 | |
| 15 | Structures 1 to 3 | <290 | >140° C. | <40 | |
| 16 | Structures 1 to 3 | <285 | >120° C. | <40 | |
| 17 | Structures 1 to 3 | <285 | >130° C. | <40 | |
| 18 | Structures 1 to 3 | <285 | >140° C. | <40 | |
| 19 | Structures 1 to 3 | <280 | >120° C. | <40 | |
| 20 | Structures 1 to 3 | <280 | >130° C. | <40 | |
| 21 | Structures 1 to 3 | <280 | >140° C. | <40 | |
| 22 | Structures 1 to 3 | <290 | >120° C. | <30 | |
| 23 | Structures 1 to 3 | <290 | >130° C. | <30 | |
| 24 | Structures 1 to 3 | <290 | >140° C. | <30 | |
| 25 | Structures 1 to 3 | <285 | >120° C. | <30 | |
| 26 | Structures 1 to 3 | <285 | >130° C. | <30 | |
| 27 | Structures 1 to 3 | <285 | >140° C. | <30 | |
| 28 | Structures 1 to 3 | <280 | >120° C. | <30 | |
| 29 | Structures 1 to 3 | <280 | >130° C. | <30 | |
| 30 | Structures 1 to 3 | <280 | >140° C. | <30 | |
| 31 | Structures 1 to 3 | <290 | >120° C. | <40 | >40 |
| 32 | Structures 1 to 3 | <290 | >130° C. | <40 | >40 |
| 33 | Structures 1 to 3 | <290 | >140° C. | <40 | >40 |
| 34 | Structures 1 to 3 | <285 | >120° C. | <40 | >40 |
| 35 | Structures 1 to 3 | <285 | >130° C. | <40 | >40 |
| 36 | Structures 1 to 3 | <285 | >140° C. | <40 | >40 |
| 37 | Structures 1 to 3 | <280 | >120° C. | <40 | >40 |
| 38 | Structures 1 to 3 | <280 | >130° C. | <40 | >40 |
| 39 | Structures 1 to 3 | <280 | >140° C. | <40 | >40 |
| 40 | Structures 1 to 3 | <290 | >120° C. | <30 | >40 |
| 41 | Structures 1 to 3 | <290 | >130° C. | <30 | >40 |
| 42 | Structures 1 to 3 | <290 | >140° C. | <30 | >40 |
| 43 | Structures 1 to 3 | <285 | >120° C. | <30 | >40 |
| 44 | Structures 1 to 3 | <285 | >130° C. | <30 | >40 |
| 45 | Structures 1 to 3 | <285 | >140° C. | <30 | >40 |
| 46 | Structures 1 to 3 | <280 | >120° C. | <30 | >40 |
| 47 | Structures 1 to 3 | <280 | >130° C. | <30 | >40 |
| 48 | Structures 1 to 3 | <280 | >140° C. | <30 | >40 |
| 49 | Structures 1 to 3 | <290 | >120° C. | <40 | >45 |
| 50 | Structures 1 to 3 | <290 | >130° C. | <40 | >45 |
| 51 | Structures 1 to 3 | <290 | >140° C. | <40 | >45 |
| 52 | Structures 1 to 3 | <285 | >120° C. | <40 | >45 |
| 53 | Structures 1 to 3 | <285 | >130° C. | <40 | >45 |
| 54 | Structures 1 to 3 | <285 | >140° C. | <40 | >45 |
| 55 | Structures 1 to 3 | <280 | >120° C. | <40 | >45 |
| 56 | Structures 1 to 3 | <280 | >130° C. | <40 | >45 |
| 57 | Structures 1 to 3 | <280 | >140° C. | <40 | >45 |
| 58 | Structures 1 to 3 | <290 | >120° C. | <30 | >45 |
| 59 | Structures 1 to 3 | <290 | >130° C. | <30 | >45 |
| 60 | Structures 1 to 3 | <290 | >140° C. | <30 | >45 |
| 61 | Structures 1 to 3 | <285 | >120° C. | <30 | >45 |
| 62 | Structures 1 to 3 | <285 | >130° C. | <30 | >45 |
| 63 | Structures 1 to 3 | <285 | >140° C. | <30 | >45 |
| 64 | Structures 1 to 3 | <280 | >120° C. | <30 | >45 |
| 65 | Structures 1 to 3 | <280 | >130° C. | <30 | >45 |
| 66 | Structures 1 to 3 | <280 | >140° C. | <30 | >45 |
| 67 | Structures 1 to 3 | <290 | >120° C. | <40 | >50 |
| 68 | Structures 1 to 3 | <290 | >130° C. | <40 | >50 |
| 69 | Structures 1 to 3 | <290 | >140° C. | <40 | >50 |
| 70 | Structures 1 to 3 | <285 | >120° C. | <40 | >50 |
| 71 | Structures 1 to 3 | <285 | >130° C. | <40 | >50 |
| 72 | Structures 1 to 3 | <285 | >140° C. | <40 | >50 |
| 73 | Structures 1 to 3 | <280 | >120° C. | <40 | >50 |
| 74 | Structures 1 to 3 | <280 | >130° C. | <40 | >50 |
| 75 | Structures 1 to 3 | <280 | >140° C. | <40 | >50 |
| 76 | Structures 1 to 3 | <290 | >120° C. | <30 | >50 |
| 77 | Structures 1 to 3 | <290 | >130° C. | <30 | >50 |
| 78 | Structures 1 to 3 | <290 | >140° C. | <30 | >50 |
| 79 | Structures 1 to 3 | <285 | >120° C. | <30 | >50 |
| 80 | Structures 1 to 3 | <285 | >130° C. | <30 | >50 |
| 81 | Structures 1 to 3 | <285 | >140° C. | <30 | >50 |
| 82 | Structures 1 to 3 | <280 | >120° C. | <30 | >50 |
| 83 | Structures 1 to 3 | <280 | >130° C. | <30 | >50 |
| 84 | Structures 1 to 3 | <280 | >140° C. | <30 | >50 |

In an advantageous embodiment, the present invention relates to a structure as defined above, characterized in that the BAC is 1,3-BAC.

Advantageously, 1,3-BAC is a mixture of cis and trans isomers in a respective proportion of 0/100 to 100/0, in particular from 75/25 to 25/75.

Advantageously, the proportion of cis isomer in the 1,3-BAC is greater than 60%, preferably greater than 70%, particularly greater than 80%, in particular greater than 90%.

In an advantageous embodiment, the present invention relates to a structure as defined above, wherein the BAC is 1,3-BAC and XT is chosen from 9T, 10T, 11T and 12T, more preferably 10T, 11T and 12T.

Advantageously, XT is 10T, 10 corresponding to 1,10-decanediamine.

In an advantageous embodiment, the present invention relates to a structure as defined above, wherein the sum of the monomers that replace terephthalic acid, BAC and X is equal to 0. In this latter embodiment, there is therefore no more possible substitution of the monomers in structures 1 to 84 as defined above.

In an advantageous embodiment, the present invention relates to a structure as defined above, wherein said layer (1) comprises an impact modifier and/or a core-shell type modifier.

The expression "impact modifier" must be understood to mean a polymer containing polyolefin having a flexural modulus less than 100 MPa measured according to standard ISO 178:2010 and Tg less than 0° C.; (measured according to standard 11357-2:2013 at the inflexion point of the DSC thermogram), particularly a polyolefin, coupled or not with a PEBA (polyether-bloc-amide) having a flexural modulus of <200 MPa.

In this advantageous embodiment, this polymer containing a polyolefin is therefore present in the copolyamide forming the layer (1).

The polyolefin of the impact modifier can be functionalized or non-functionalized or be a mixture of at least one functionalized polyolefin and/or least one non-functionalized polyolefin.

In particular, a part or all of the polyolefins relates to a function chosen from the carboxylic acid functions, carboxylic anhydride and epoxide, and is particularly chosen from a copolymer of ethylene and propylene with an elastomer character (EPR), an ethylene-propylene-diene copolymer with elastomer character (EPDM) and an ethylene/alkyl (meth)acrylate copolymer, a higher ethylene-alkene copolymer, particularly an ethylene-octene copolymer, an ethylene-alkyl acrylate-maleic anhydride terpolymer.

Advantageously, the impact modifier is chosen from Fusabond. F493, Lotader®, particularly Lotader 5500 or Lotader 7500, Escor VA1801 or VA1803, Excelsior E1040, Amplify GR216, Tafmer M145020 or Orevac IM800, or a mixture of these, in which case they are in a ratio ranging from 0.1/99.9 to 99.9/0.1, preferably 1/2 to 2/1 when they are in a mixture of two.

As an example, the impact modifier is chosen from the following mixtures: F493/Lotader®, particularly F493/Lotader® 5500 or F493/Lotader® 7500.

The expression "core-shell type modifier" or "core-shell modifier" is also denoted "core-shell copolymer."

The "core-shell modifier" is presented in the form of fine particles having an elastomer core and at least one thermoplastic shell, the particle size is generally less than a μm and advantageously inclusively between 150 and 500 nm.

The "core-shell type modifier" has an acrylic or butadiene base by contrast with the impact modifier, which has a polyolefin base.

As an example of shell mention may be made of homopolymers of isoprene or butadiene, copolymers of isoprene with at most 30 mol % of a vinyl monomer and butadiene copolymers with at most 30 mol % of a vinyl monomer. The vinyl monomer can be styrene, an alkylstyrene, acrylonitrile or an alkyl (meth)acrylate. Another shell family is formed of homopolymers of an alkyl (meth)acrylate and copolymers of an alkyl (meth)acrylate with at most 30 mol % of a vinyl monomer. The alkyl (meth)acrylate is advantageously butyl acrylate. The vinyl monomer can be styrene, an alkylstyrene, acrylonitrile butadiene or isoprene. The copolymer shell (A) can be crosslinked in whole or part. It is sufficient to add at least difunctional monomers during preparation of the shell, these monomers can be chosen from poly(meth)acrylic esters of polyols such as butylene di(meth)acrylate and trimethylol propane trimethacrylate. Other difunctional monomers are for example divinylbenzene, trivinylbenzene, vinyl acrylate and vinyl methacrylate. The shell can also be crosslinked by introducing, by grafting or as comonomer during polymerization, unsaturated functional monomers such as unsaturated carboxylic acid anhydrides, unsaturated carboxylic acids and unsaturated epoxides. Mention may be made for example of maleic anhydride, (meth)acrylic acid and glycidyl methacrylate.

The shell or shells are homopolymers of styrene, an alkylstyrene or methyl methacrylate or copolymers comprising at least 70 mol % of one of these previous monomers and at least one comonomer chosen from the other previous monomers, vinyl acetate and acrylonitrile. The shell can also be functionalized by introducing, by grafting or as comonomer during polymerization, unsaturated functional monomers such as unsaturated carboxylic acid anhydrides, unsaturated carboxylic acids and unsaturated epoxides. Mention may be made for example of maleic anhydride, (meth)acrylic acid and glycidyl methacrylate. As an example, mention may be made of core-shell copolymers (A) having a polystyrene shell and core-shell copolymers (A) having a PMMA shell. Core-shell copolymers (A) having two shells also exist, one made of polystyrene and the other made of a PMMA shell. Examples of copolymer (A) and their preparation process are described in the following patents: U.S. Pat. Nos. 4,180,494, 3,808,180, 4,096,202, 4,260,693, 3,287,443, 3,657,391, 4,299,928, 3,985,704.

The "core-shell type modifier" is therefore different from the polyolefin of the impact modifier and in particular in that the impact modifier reacts with the polyamide matrix whereas the the core-shell does not react with its core because it could only react with its shell.

Advantageously, the impact modifier and/or the core-shell type modifier is present from 5 to 35% by weight relative to the weight of all the constituents of the copolyamide of layer (1), particularly from 5 to 25%, and more particularly from 5 to 15%.

Advantageously, the invention relates therefore to a structure as defined above comprising at least one layer (1) comprising a BACT/XT copolyamide as defined above and comprising an impact modifier and/or a core-shell type modifier in a proportion from 5 to 35% by weight relative to the weight of all the constituents of the copolyamide, particularly from 5 to 25%, and more particularly from 5 to 15%.

Advantageously, in structures comprising an impact modifier and/or a core-shell type modifier, X is 1,10-decanediamine.

In an advantageous embodiment, the present invention relates to a structure as defined above, wherein said structure is constituted of a single layer (1).

Therefore here the invention relates to a monolayer tubing and in this embodiment, no other layer is present.

In an advantageous embodiment, the present invention relates to a structure as defined above, wherein said layer (1) comprises a stabilizer chosen from an organic stabilizer, an inorganic stabilizer, particularly a stabilizer containing copper, or a mixture thereof.

The expression "organic stabilizer" or more generally a "combination of organic stabilizers," denotes a primary antioxidant of the phenol type, a secondary antioxidant of the phosphite type and optionally other stabilizers such as a HALS, which means hindered amine light stabilizer (for example Ciba's Tinuvin® 770), an anti-UV (for example Ciba's Tinuvin® 312), a phenol stabilizer or a stabilizer containing phosphorus. Amine antioxidants such as Crompton's Naugard® 445 or polyfunctional stabilizers such as Clariant's Nylostab® S-EED can also be used.

The organic stabilizer present in the layer (1) can be chosen, without this list being restrictive, from among:

phenol antioxidants, for example Ciba's Irganox® 245, Irganox® 1010, Irganox® 1098, Ciba's Irganox® MD1024, Great Lakes' Lowinox® 44B25, Adeka Palmarole's ADK® Stab AO-80.

stabilizers containing phosphorus, such as phosphites, for example Ciba's Irgafos® 168, a UV absorber, such as Ciba's Tinuvin® 312, a HALS, as previously stated, an amine type stabilizer, such as Crompton's Naugard® 445, or even a hindered amine type such as Ciba's Tinuvin® 770, a polyfunctional stabilizer such as Clariant's Nylostab® S-EED.

A mixture of two or more of these organic stabilizers can obviously be envisaged.

Preferably, the organic stabilizer is present within the copolyamide of the layer (1) of the structure in a content inclusively between 0.3 and 3% by weight relative to the total weight of the constituents of the copolyamide.

The expression "mineral stabilizer" denotes a stabilizer containing copper. As an example of such mineral stabilizers, mention may be made of halides and copper acetates. Secondarily, other metals such as silver can optionally be considered, but these are known to be less effective. These compounds containing copper are typically associated with alkali metal halides.

These mineral stabilizers are more particularly employed when the structures must have improved long-term heat resistance in hot air, in particular for temperatures greater than or equal to 100-120° C., because they tend to prevent breaks in polymer chains.

More particularly, a stabilizer containing copper is understood to mean a compound comprising at least one copper atom, in particular in ionizable, ionic form, for example in the form of a complex.

The stabilizer containing copper present within the layer (1) can be chosen from copper chloride, cuprous chloride, copper bromide, cuprous bromide, copper iodide, cuprous iodide, copper acetate and cuprous acetate. Mention may be made of halides and acetates of other metals such as silver in combination with the stabilizer containing copper. These compounds containing copper are typically associated with halides of alkali metals, particularly potassium. A well known example is the mixture of CuI and KI, where the ratio CuI:KI is typically inclusively between 1:5 to 1:15. An example of such a stabilizer is Ciba's Polyadd P201.

More details on stabilizers containing copper are found in U.S. Pat. No. 2,705,227. More recently, stabilizers containing copper such as copper complexes such as Brüggemann's Bruggolen H3336, H3337, H3373.

Advantageously, the stabilizer containing copper is chosen from copper halides, copper acetate, copper halides or copper acetate in mixture with at least one alkali metal halide, and mixtures thereof, preferably mixtures of copper iodide and potassium iodide (CuI/KI).

Preferably, the stabilizer containing copper is present in the layer (I) of the structure in a content inclusively between 0.05 and 1.5% by weight relative to the total weight of the constituents of the copolyamide.

Preferably, the layer (1) does not comprise any additional transition metal,

Advantageously, the invention relates therefore to a structure as defined above comprising at least one layer (1) comprising a BACT/XT copolyamide as defined above and comprising an impact modifier and/or a core-shell type modifier in a proportion from 5 to 35% by weight relative to the weight of all the constituents of the copolyamide and an organic stabilizer.

Advantageously, the invention relates therefore to a structure as defined above comprising at least one layer (1) comprising a BACT/XT copolyamide as defined above and comprising an impact modifier and/or a core-shell type modifier in a proportion from 5 to 35% by weight relative to the weight of all the constituents of the copolyamide and an inorganic a mineral stabilizer, particularly a stabilizer containing copper.

Advantageously, the invention relates therefore to a structure as defined above comprising at least one layer (1) comprising a BACT/XT copolyamide as defined above and comprising an impact modifier and/or a core-shell type modifier in a proportion from 5 to 35% by weight relative to the weight of all the constituents of the copolyamide and a mixture of an organic stabilizer and mineral stabilizer, particularly a stabilizer containing copper.

Advantageously, the invention relates therefore to a structure as defined above comprising at least one layer (1) comprising a BACT/XT copolyamide as defined above and comprising an impact modifier and/or a core-shell type modifier in a proportion from 5 to 25% by weight relative to the weight of all the constituents of the copolyamide and an organic stabilizer.

Advantageously, the invention relates therefore to a structure as defined above comprising at least one layer (1) comprising a BACT/XT copolyamide as defined above and comprising an impact modifier and/or a core-shell type modifier in a proportion from 5 to 25% by weight relative to the weight of all the constituents of the copolyamide and a mineral stabilizer, particularly a stabilizer containing copper.

Advantageously, the invention relates therefore to a structure as defined above comprising at least one layer (1) comprising a BACT/XT copolyamide as defined above and comprising an impact modifier and/or a core-shell type modifier in a proportion from 5 to 25% by weight relative to the weight of all the constituents of the copolyamide and a mixture of an organic stabilizer and mineral stabilizer, particularly a stabilizer containing copper.

Advantageously, in structures comprising an impact modifier and/or a core-shell type modifier, and a stabilizer X is 1,10-decanediamine.

In an advantageous embodiment, the present invention relates to a structure as defined above, wherein said layer (1) comprises an antistatic filler, particularly chosen from carbon black and graphite, particularly carbon black.

In an advantageous embodiment, the present invention relates to a structure as defined above, wherein said layer (1) comprises at least one additive chosen from an antioxidant, a heat stabilizer, a UV absorber, a light stabilizer, a lubricant, an inorganic filler, a flame retardant, a nucleating agent, a plasticizer and a colorant.

Strengthening fibers are excluded from the additives and particularly the term "inorganic filler" excludes strengthening fibers.

Advantageously, the additive or additives are present in the layer (1) in a proportion by weight of 1 to 20%, particularly from 5 to 15%, relative to the total weight of the constituents of the layer (1).

In an advantageous embodiment, the present invention relates to a structure as defined above, wherein a second layer (2) is present, where layers (1) and (2) could adhere to one another.

The expression "could adhere to one another" means that if the structure is constituted of two layers, the layers (1) and (2) adhere to one another, at least partially.

If the structure comprises at least one third layer, said third layer can be placed between the layer (1) and the layer (2), in which case the layers (1) and (2) do not adhere together but by contrast layers (1) and (3) adhere together as do layers (3) and (2).

Advantageously, the structure is constituted of two layers (1) and (2) that adhere together.

Advantageously, said layer (2) comprises at least one polyamide chosen from an aliphatic polyamide and an aromatic polyamide, particularly an aliphatic polyamide.

Advantageously, said aliphatic polyamide is from the polycondensation of at least one lactam or of at least one aminocarboxylic acid, or of one diamine and one dicarboxylic acid or of a mixture of those, the diamine being chosen from an aliphatic diamine, a cycloaliphatic diamine and the dicarboxylic acid being chosen from an aliphatic diacid and a cycloaliphatic diacid, or a mixture of those.

The aminocarboxylic acid can be chose from 9-aminononanoic acid, 10-aminodecanoic acid, 12-aminododecanoic acid and 11-aminoundecanoic acid and its derivatives, in particular N-heptyl-11-aminoundecanoic acid, advantageously 12-aminododecanoic acid and 11-aminoundecanoic acid.

The lactam can be chosen from pyrrolidinone, piperidinone, caprolactam, enantholactam, caprylolactam, pelargolactam, decanolactam, undecanolactam, and laurolactam, advantageously undecanolactam, and laurolactam.

When the diamine is aliphatic and linear, it has formula $H_2N-(CH_2)a-NH_2$. The diacid can be aliphatic (in particular linear aliphatic), cycloaliphatic or aromatic.

Preferably, when the diamine is linear and aliphatic, it is chosen from butanediamine (a=4), pentanediamine (a=5), hexanediamine (a=6), heptanediamine (a=7), octanediamine (a=8), nonanediamine (a=9), decanediamine (a=10), undecanediamine (a=11), dodecanediamine (a=12), tridecanediamine (a=13), tetradecanediamine (a=14), hexadecanediamine (a=16), octadecanediamine (a=18), octadecenediamine (a=18), eicosanediamine (a=20), docosanediamine (a=22) and diamines obtained from dimerized fatty acids.

When the diamine is cycloaliphatic, it is chosen preferably from those comprising two cycles. In particular they have the following general formula:

wherein:
R1, R2, R3 and R4 represent independently a group chosen from a hydrogen atom or an alkyl with 1 to 6 carbon atoms and
X represents either a single bond, or a divalent group constituted:
of a linear or branched aliphatic chain comprising from 1 to 10 carbon atoms, optionally substituted by cycloaliphatic or aromatic groups with 6 to 8 carbon atoms,
of a cycloaliphatic group with 6 to 12 carbon atoms.
More preferably, cycloaliphatic diamine Ca of the polyamide is chosen from among bis(3,5-dialkyl-4-aminocyclohexypmethane, bis(3,5-dialkyl-4-aminocyclohexyl) ethane, bis(3,5-dialkyl-4-aminocyclo-hexyl)propane, bis(3,5-dialkyl-4-amino cyclo-hexyl)butane, bis-(3-methyl-4-aminocyclohexyl)-methane (denoted BMACM, MACM or B), p-bis (aminocyclohexyl)-methane (PACM) and isopropylidene di(cyclohexylamine) (PACT).

A non-exhaustive list of these cycloaliphatic diamines is given in the publication "Cycloaliphatic Amines" (Encyclopaedia of Chemical Technology, Kirk-Othmer, 4th Edition (1992), pp. 386-405).

The aliphatic and linear dicarboxylic acid is chosen from succinic acid (b=4), pentanedioic acid (b=5), adipic acid (b=6), heptanedioic acid (b=7), octanedioic acid (b=8), azelaic acid (b=9), sebacic acid (b=10), undecanedioic acid (b=11), dodecanedioic acid (b=12), brassylic acid (b=13), tetradecanedioic acid (b=14), hexadecanedioic acid (b=16), octadecanoic acid (b=18), octadecenedioic acid (b=18), eicosanedioic acid (b=20), docosanedioic acid (b=22) and fatty acid dimers containing 36 carbons.

The fatty acid dialers mentioned above are dimerized fatty acids obtained by oligomerization or polymerization of monobasic unsaturated long-chain hydrocarbon fatty acids (such as linoleic acid and oleic acid), as described in particular in document EP 0 471 566.

When the diacid is cycloaliphatic, it can include the following carbon backbones: norbornylmethane, cyclohexylmethane, dicyclohexylmethane, dicycohexylpropane, di(methycyclohexyl) propane.

The polyamide of layer (2) can be a homopolyamide or a copolyamide.

The nomenclature used to define polyamides is described in standard ISO 16396-1:2015 "Plastics—Polyamide (PA) moulding and extrusion materials—Part 1:—Designation system, marking of products and basis for specifications."

Advantageously, the polyamide of layer (2) is chosen from PA11, PA12, PA1010, PA1012, PA610 and PA612.

In an advantageous embodiment, the present invention relates to a structure as defined above, wherein another polyamide, different than that of the layer (2) can be present in the layer (2).

In other words, an additional polyamide different from the polyamide in layer (2) defined above is present in the layer (2).

The term "different" means that when the polyamide of the layer (2) is chosen from an aliphatic polyamide and an aromatic polyamide, particularly an aliphatic polyamide, the additional polyamide also be an aliphatic polyamide or an aromatic polyamide provided that it is not the one used for layer (2).

Said other polyamide is as defined above in the layer (2) provided that it is different from that of layer (2).

Advantageously, a plasticizer is present in layer (2).

Advantageously, the plasticizer of layer (2) is present from 1 to 20%, particularly from 5 to 15% by weight relative to the weight relative to the weight of all of the constituents of the copolyamide of layer (2).

In an advantageous embodiment, the present invention relates to a structure as defined above, wherein an impact modifier and/or a core-shell type modifier is present in the layer (2).

The impact modifier and/or the core-shell type modifier are as defined above.

Advantageously, the impact modifier and/or the core-shell type modifier is present from 5 to 35% by weight relative to the weight of all of the constituents of the copolyamide of layer (2), particularly from 5 to 25%, and more particularly from 5 to 15%.

In an advantageous embodiment, the present invention relates to a structure as defined above, wherein a second layer (2) is present, layers (1) and (2) adhering together, layer (1) being one of those defined above, and layer (2) comprising another polyamide or not, layer (2) comprising a plasticizer from 1 to 20% by weight and an impact modifier and/or a core-shell type modifier in a proportion from 5 to 35% by weight relative to the weight of all of the constituents of the copolyamide of layer (2).

In an advantageous embodiment, the present invention relates to a structure as defined above, wherein a second layer (2) is present, layers (1) and (2) adhering together, layer (1) being one of those defined above, and layer (2) comprising another polyamide or not, layer (2) comprising a plasticizer from 1 to 20% by weight and an impact modifier and/or a core-shell type modifier in a proportion from 5 to 25% by weight relative to the weight of all of the constituents of the copolyamide of layer (2).

In an advantageous embodiment, the present invention relates to a structure as defined above, wherein a second layer (2) is present, layers (1) and (2) adhering together, layer (1) being one of those defined above, and layer (2) comprising another polyamide or not, layer (2) comprising a plasticizer from 5 to 15% by weight and an impact modifier and/or a core-shell type modifier in a proportion from 5 to 35% by weight relative to the weight of all of the constituents of the copolyamide of layer (2).

In an advantageous embodiment, the present invention relates to a structure as defined above, wherein a second layer (2) is present, layers (1) and (2) adhering together, layer (1) being one of those defined above, and layer (2) comprising another polyamide or not, layer (2) comprising a plasticizer from 5 to 15% by weight and an impact modifier and/or a core-shell type modifier in a proportion from 5 to 25% by weight relative to the weight of all of the constituents of the copolyamide of layer (2).

In an advantageous embodiment, the present invention relates to a structure as defined above, wherein a second layer (2) is present, wherein said layer (2) comprises a stabilizer chosen from an organic stabilizer, an inorganic stabilizer, particularly a stabilizer containing copper, or a mixture thereof.

The stabilizers are as defined above.

In an advantageous embodiment, the present invention relates to a structure as defined above, wherein a second layer (2) is present, wherein layer (1) comprises an organic stabilizer and layer (2) comprises an inorganic stabilizer, particularly a stabilizer containing copper.

In an advantageous embodiment, the present invention relates to a structure as defined above, wherein a layer (2) is present, wherein layer (1) comprises an inorganic stabilizer, particularly a stabilizer containing copper and the layer (2) comprises an organic stabilizer.

In an advantageous embodiment, the present invention relates to a structure as defined above, wherein a second layer (2) is present, wherein said layer (2) comprises an antistatic filler chosen from carbon black and graphite, particularly carbon black.

In an advantageous embodiment, the present invention relates to a structure as defined above, wherein a second layer (2) is present, wherein said layer (2) comprises at least one additive chosen from an antioxidant, a heat stabilizer, a UV absorber, a light stabilizer, a lubricant, an inorganic filler, a flame retardant, a nucleating agent and a colorant.

In an advantageous embodiment, the present invention relates to a structure as defined above, wherein the layer (1) is a barrier layer, in particular to a fluid, said fluid being chosen from a fuel, said fuel being a gasoline, particularly a bio-gasoline (mixture of gasoline and alcohol, in particular of methanol or ethanol), or of diesel, particularly bio-diesel, an oil, a brake fluid, urea solutions, a cooling liquid containing glycol, a gas, particularly compressed air, said barrier layer (1) is in contact with the fluid.

The structure defined in this embodiment therefore comprises at least one layer (1) and can therefore be monolayer or bilayer (1) and (2) without departing from the scope of the invention if the structure were to comprise other layers.

Advantageously, the structure is constituted of two layers (1) and (2) and layer (1) is the barrier layer.

Consequently, in the case where the structure comprises two layers, it comprises from the outside to the inside the following layers: (2)//(1).

In the case where the structure comprises at least one other layer, the latter cannot be in contact with the fluid.

In an advantageous embodiment, the present invention relates to a structure comprising at least one layer (1) as defined above, and a second layer (2) as defined above, where layers (1) and (2) could adhere to one another, also comprising a layer (3), the layer (3) being identical or different from layer (1).

In this embodiment, the structure comprises or is constituted of the following layers, from the outside to the inside:
(3)//(2)//(1) or (2)//(3)//(1), Advantageously, layer (3) is different from layer (1) and is a bonding layer and the structure comprises from the outside to the inside the following layers: (2)//(3)//(1), layer (1) being in contact with the fluid.

Advantageously, in the structure (2)//(3)//(1), layer (1) has a thickness of 100 to 300 µm, in particular of 200 to 300 µm, particularly 250 µm, layer (3) has a thickness of 50 to 100 µm or of 100 to 200 µm, particularly 150 µm and layer (2) has a thickness of 50 to 800 µm, in particular of 50 to 200 µm or of 500 to 700 µm.

The bonding layer can be a mixture of at least one polyamide having a mean number of carbon atoms per nitrogen atom denoted inclusively between 4 and 8.5, advantageously between 4 and 7; at least one polyamide having a melting temperature greater than or equal to 180° C. and a mean number of carbon atoms per nitrogen atom inclusively between 7 and 10, advantageously between 7.5 and 9.5 and at least one polyamide having a mean number of carbon atoms per nitrogen atom inclusively between 9 and 18, advantageously between 10 and 18, in particular as defined in document WO 09/122060.

In an advantageous embodiment, the present invention relates to a structure comprising at least one layer (1) as defined above, a second layer (2) as defined above, where layers (1) and (2) could adhere to one another and a layer (3), the layer (3) being identical or different from layer (1), said structure also comprising at least one other layer (4), layer (1) being in contact with the fluid.

Advantageously, layer (4) is a layer of EVOH.

In an advantageous embodiment, the present invention relates to a structure comprising at least one layer (1) as defined above, a second layer (2) as defined above, where layers (1) and (2) could adhere to one another and a layer (3), the layer (3) being identical or different from layer (1) and at least one other layer (4), layer (1) being in contact with the fluid, said structure comprising from the outside to the inside the following layers: (2)//(4)//(3)//(1), layer (1) being in contact with the fluid.

Advantageously, in the structure (2)//(4)//(3)//(1), layer (3) is a bonding layer as defined above.

Advantageously, in the structure (2)//(4)//(3)//(1), layer (4) is an EVOH layer as defined above.

Advantageously, in the structure (2)//(4)//(3)//(1), layer (3) is a bonding layer as defined above and layer (4) is a layer of EVOH as defined above.

Advantageously, the structure is constituted of layers (2)//(4)//(3)//(1) as defined above.

In an advantageous embodiment, the present invention relates to a structure comprising at least one layer (1) as defined above, a second layer (2) as defined above, where layers (1) and (2.) could adhere to one another, a layer (3), the layer (3) being identical or different from layer (1), at least one other layer (4), layer (1) being in contact with the fluid, and comprising from the outside to the inside the following layers: (2)//(4)//(3)//(1), layer (1) being in contact with the fluid, Said structure also comprising a bonding layer (3'), identical or different from bonding layer (3), is present.

Layer (3') is therefore a binder of the same type as that defined above for layer (3) but with identical or different composition.

Advantageously, said structure also comprising a bonding layer (3'), comprises from the outside to the, inside the following layers: (2)//(3')//(4)//(3)//(1), layer (1) being in contact with the fluid.

Advantageously, layer (1) has a thickness of 100 to 200 μm, particularly 150 μm, layer (2) has a thickness of 100 to 200 μm, particularly 150 μm, layer (3) has a thickness of 200 to 400 μm, particularly 300 μm, layer (3') has a thickness of 200 to 400 μm, particularly 300 μm and layer (4) of 50 μm to 150 μm, particularly 100 μm.

According to another feature, the present invention relates to bottles, tanks, containers, tubing and vessels made with one of the structures as defined as above.

According to another feature, the present invention relates to packaging made of films made with one of the structures as defined as above.

According to another feature, the present invention relates to the use of a BACT/XT copolyamide wherein:

BACT is a unit with an amide moiety present at a molar content ranging from 20 to 70%, preferably from 25 to 60%, more preferably from 35 to 55%, where BAC is chosen from among 1,3-bis(aminomethyl)cyclohexane (1,3-BAC), 1,4-bis(aminomethyl)cyclohexyl (1,4-BAC) or a mixture thereof, and T is terephthalic acid, XT is a unit with an amide moiety present at a molar content ranging from 30 to 80%, preferably from 40 to 75%, more preferably from 45 to 65%, where X is a C9 to C18 linear aliphatic diamine, preferably C9, C10, C11 or C12, and where T is terephthalic acid, preferably C10, C11 or C12.

in the BACT and/or XT units, independently of each other, up to 30 mol %, preferably 20 mol %, particularly up to 10 mol % of terephthalic acid, relative to the total quantity of dicarboxylic acids, can be replaced by other diaromatic, dialiphatic or di(cyclo)aliphatic acids comprising 6 to 36 carbon atoms, particularly 6 to 14 carbon atoms, and in the BACT and/or XT units, independently of each other, up to 30 mol %, preferably 20 mol %, particularly up to 10 mol %, of BAC and/or if applicable X, relative to the total quantity of the diamines, can be replaced by other diamines comprising from 4 to 36 carbon atoms, particularly 6 to 12 carbon atoms, and in the copolyamide, not more than 30 mol %, preferably not more than 10 mol %, relative to the total quantity of the monomers, can be formed by lactams or aminocarboxylic acids, and provided that the sum of the monomers that replace terephthalic acid, BAC and X does not exceed a concentration of 30 mol %, preferably 10 mol %, relative to the total quantity of the monomers used in the copolyamide, and provided that BACT and XT units are still present in said polyamide polymer, for manufacturing a structure, in particular a multilayer structure, comprising at least one barrier layer (1) comprising said BACT/XT copolyamide, said structure being devoid of strengthening fibers.

EXAMPLES

1) Preparation of a BACT/10T and Comparison Polyamides

The procedure that follows is an example of a preparation process, and is not limiting. It is representative of all the compositions according to the invention and comparison compositions:

To a 14 liter autoclave reactor, 5 kg of the following raw materials are added:

500 g water,
the diamines,
the amino acid (optionally),
terephthalic acid and optionally one or the other of the diacids,
the monofunctional chain regulator: benzoic acid in a suitable quantity for the target Mn and varying (benzoic acid) from 50 to 100 g,
35 g of sodium hypophosphite in solution,
0.1 g of a WACKER AK1000 antifoam agent (from Wacker Silicones)

The nature and molar ratios of the molecular moieties and structures of the polyamides (per test, referenced) are given in Table III below.

The 1,3-BAC used had a cis/trans ratio of 75/25 mol %.

The closed reactor is purged of its residual oxygen then heated to a temperature of 230° C. relative to the material added. After 30 minutes of stirring in these conditions, the vapor that formed under pressure in the reactor is relaxed progressively over 60 minutes, while progressively increasing the material temperature so as to establish it at Tm+10° C. at atmospheric pressure.

The polymerization then continues under a nitrogen purge of 20 dm³/h (20 L/h) until the target mass Mn indicated in the table of characteristics is obtained.

The polymer is then emptied through the bottom valve then cooled in a water bath then shaped into granules.

The products are then injected in the form of 100 mm×100 mm×1 mm plate using an injection press, using an injection temperature equal to Tm+20° C. and a mold heated to 100° C. The plates, not entirely crystallized (presence of recrystallization on DSC heating according to ISO 11357-2:2013) are annealed for 2 h under vacuum at Tg+30° C.

The intrinsic or inherent viscosity is measured in m-cresol. The method is well known to the person skilled in the art. Standard ISO 307:2007 is followed but changing the solvent (use m-cresol instead of sulfuric acid and the temperature is 20° C.).

The glass transition temperature Tg is measured using a differential scanning calorimeter (DSC), after a second heating pass, according to standard ISO 11357-2:2013. The heating and cooling rates are 20+ C./min.

The melting temperature Tm and the crystallization temperature Tc are measured by DSC, according to standard ISO 11357-3:2013, The heating and cooling rates are 20° C.//min.

The crystallization enthalpy of said polymer matrix is measured using differential scanning calorimetry (DSC), after a second heating pass, according to standard ISO 11357-3:2013.

The levels of amine and acid chain ends are determined by potentiometry.

The fuel permeability is measured at 60° C. according to a gravimetric method with CE10: isooctane/toluene/ethanol=45/45/10 vol % and CE85: isooctane/toluene/ethanol=7.5/7.5/85 vol % on the plates prepared above. The instant permeability is zero during the induction period, then it increases progressively up to a value at equilibrium that corresponds to the permeability value in the permanent regime. This value obtained in the permanent regime is considered as being the material's permeability.

The results are shown in Table III below.

TABLE III

| Ref | Molecular structure/ (Molar composition) | Tm (° C.)/ Tg (° C.) | Tc (° C.)/ Tm − Tc (° C.) | ΔHc | Inherent viscosity (m-cresol) | Permeability CE10 g · mm/ m² · 24 h | Permeability CE85 g · mm/ m² · 24 h | NH₂ µeq/g CO₂H µeq/g |
|---|---|---|---|---|---|---|---|---|
| I1 | BACT/10T (50/50) | 282/153 | 248/33 | 53.5 | 1.05 | 0.3 | 1.7 | 54 67 |
| C1 | MXDT/10T (41/59) | 269/131 | — | — | 1.01 | 0.3 | 2 | 38 134 |
| C2 | 8MT/9T (48/52) | 265/125 | — | — | 1.25 | 0.5 | 3.2 | |
| C3 | (10I/10T 33.3/66.6) | 283/107 | 205/78 | 32 | 1.11 | 0.4 | 7 | |
| C4 | 10T/6T/11 (42.5/42.5/15) | 269/114 | — | — | 1.25 | 0.8 | 5 | |
| C5 | 10T/6T/11 (61/24.5/14.5) | 269/111 | 220/49 | 39 | 1.25 | 0.35 | 6 | |
| C6 | 10T/10I/11 (64/20.5/15.5) | 265/100 | — | — | 1.15 | 2.75 | 20 | |
| C7 | 11/6T (35/65) | 312/100 | — | — | 1.21 | 0.65 | 6.7 | |
| C8 | 11/6T (50/50) | 273/79 | — | — | 1.05 | 20 | 76 | |
| C9 | 11/10T (33.3/66.6) | 269/84 | 232/37 | 50 | 1.18 | 3.1 | 13 | |

I: Invention
C: Comparison

The structures of the invention show fuel permeability lower that that of the comparison structures, i.e. higher barrier properties to fuels than those of comparison structures.

The invention claimed is:

1. A fuel storage or fuel transportation object containing a structure, the structure comprising at least one layer (1) comprising a BACT/XT copolyamide and a second layer (2), where layers (1) and (2) adhere to one another, wherein the layer (1) is a barrier layer, said barrier layer (1) is in contact with a fluid, selected from the group consisting of an automotive fuel, gasoline, bio-gasoline, and bio-diesel, wherein:
BACT is a unit with an amide moiety present at a molar content ranging from 20 to 70%, where BAC is selected from the group consisting of 1,3-bis(aminomethyl)cyclohexane (1,3-BAC), 1,4-bis(aminomethyl)cyclohexyl (1,4-BAC) and a mixture thereof, and T is terephthalic acid;
XT is a unit with an amide moiety present at a molar content ranging from 30 to 80%, where X is a C9 to C18 linear aliphatic diamine, and where T is terephthalic acid;
wherein:
the BACT/XT copolyamide has a ratio of groups with amine chain ends to groups with acid chain ends that is less than 5, said ratio being determined by potentiometry,
the BACT/XT copolyamide has a glass transition temperature Tg>120° C., determined according to standard ISO 11357-2:2013,
the structure is devoid of strengthening fibers; and
wherein optionally:
the BACT and/or XT units, independently of each other, have up to 30 mol % of their terephthalic acid units, relative to the total quantity of dicarboxylic acids, replaced with other aromatic, aliphatic or cycloaliphatic diacids comprising 6 to 36 carbon atoms,
the BACT and/or XT units, independently of each other, have up to 30 mol % of their BAC and/or X units, relative to the total diamine quantity, replaced by other diamines comprising from 4 to 36 carbon atoms, and
not more than 30 mol %, relative to the total quantity of the monomers, of the BACT/XT copolyamide is formed by lactams or aminocarboxylic acids,
provided that the sum of optional monomers that replace terephthalic acid, BAC and X does not exceed a concentration of 30 mol %, relative to the total quantity of the monom ers used in the copolyamide.

2. The fuel storage or fuel transportation object according to claim 1, wherein said copolyamide has a melting temperature Tm<290° C., as determined according to standard ISO 11357-3 (2013).

3. The fuel storage or fuel transportation object according to claim 1, wherein said copolyamide has a difference between the melting temperature and the crystallization temperature Tm−Tc<40° C., determined according to standard ISO 11357-3:2013.

4. The fuel storage or fuel transportation object according to claim 1 wherein the enthalpy of crystallization of the copolyamide, measured by differential scanning calorimetry (DSC) according to standard ISO 11357-3:2013, is greater than 40 J/g.

5. The fuel storage or fuel transportation object according to claim 1, wherein the BAC is 1,3-BAC.

6. The fuel storage or fuel transportation object according to claim 1 wherein the BAC is 1,3-BAC and XT is selected from the group consisting of 9T, 10T, 11T and 12T.

7. The fuel storage or fuel transportation object according to claim 1 wherein the XT is 10T, wherein 10 corresponds to 1,10-decanediamine.

8. The fuel storage or fuel transportation object according to claim 1 wherein the sum of the monomers that replace terephthalic acid, BAC and X is equal to 0.

9. The fuel storage or fuel transportation object according to claim 1, wherein said at least one layer (1) comprises an impact modifier and/or a core-shell type modifier.

10. The fuel storage or fuel transportation object according to claim 1, wherein said structure consists of layers (1) and (2).

11. The fuel storage or fuel transportation object according to claim 1, wherein said at least one layer (1) comprises a stabilizer chosen from an organic stabilizer, an inorganic stabilizer, or a mixture thereof.

12. The fuel storage or fuel transportation object according to claim 1 wherein said at least one layer (1) comprises an antistatic filler selected from the group consisting of carbon black and graphite.

13. The fuel storage or fuel transportation object according to claim 1, wherein said at least one layer (1) comprises at least one additive selected from the group consisting of an antioxidant, a heat stabilizer, a UV absorber, a light stabilizer, a lubricant, an inorganic filler, a flame retardant, a nucleating agent, a plasticizer and a colorant.

14. The fuel storage or fuel transportation object according to claim 1, wherein said layer (2) comprises at least one polyamide selected from the group consisting of an aliphatic polyamide and an aromatic polyamide.

15. The fuel storage or fuel transportation object according to claim 14, wherein said aliphatic polyamide is from the polycondensation of at least one lactam, an aminocarboxylic acid, or of a diamine and a dicarboxylic acid, the diamine being selected from the group consisting of an aliphatic diamine, an aromatic diamine and a cycloaliphatic diamine and the dicarboxylic acid being selected from the group consisting of an aliphatic diacid, an aromatic diacid, and a cycloaliphatic diacid and a mixture thereof.

16. The fuel storage or fuel transportation object according to claim 14, wherein said aliphatic polyamide of layer (2) is selected from the group consisting of PA11, PA12, PA1010, PA1012, PA610 and PA612.

17. The fuel storage or fuel transportation object according to claim 14, wherein layer (2) further comprises another polyamide, different than that of said layer (2) polyamide.

18. The fuel storage or fuel transportation object according to claim 1, wherein layer (2) comprises a plasticizer.

19. The fuel storage or fuel transportation object according to claim 1, wherein layer (2) comprises an impact modifier.

20. The fuel storage or fuel transportation object according to claim 1, wherein said layer (2) comprises a stabilizer selected from the group consisting of organic stabilizer, an inorganic stabilizer, a stabilizer containing copper, and a mixture thereof.

21. The fuel storage or fuel transportation object according to claim 1, wherein the layer (1) comprises an organic stabilizer and the layer (2) further comprises an inorganic stabilizer.

22. The fuel storage or fuel transportation object according to claim 1, wherein the layer (1) comprises an inorganic stabilizer, and the layer (2) comprises an organic stabilizer.

23. The fuel storage or fuel transportation object according to claim 1, wherein said layer (2) comprises an antistatic filler chosen from carbon black and graphite.

24. The fuel storage or fuel transportation object according to claim 1, wherein said layer (2) comprises at least one additive selected from the group consisting of an antioxidant, a heat stabilizer, a UV absorber, a light stabilizer, a lubricant, an inorganic filler, a flame retardant, a nucleating agent, a plasticizer and a colorant.

25. The fuel storage or fuel transportation object according to claim 1, further comprising a bonding layer (3), the layer (3) being identical or different from layer (1).

26. The fuel storage or fuel transportation object according to claim 25, wherein layer (3) is different from layer (1) and is a bonding layer and the structure comprises from the outside to the inside the following layers: (2)//(3)//(1), layer (1) being in contact with the fluid.

27. The fuel storage or fuel transportation object according to claim 25, further comprising at least one other layer (4), the layer (1) being in contact with the fluid.

28. The fuel storage or fuel transportation object according to claim 27, wherein the layer (4) is a layer of EVOH.

29. The fuel storage or fuel transportation object according to claim 27, wherein the structure comprises from the outside to the inside the following layers: (2)//(4)//(3)//(1), layer (1) being in contact with the fluid.

30. The fuel storage or fuel transportation object according to claim 25, further comprising a bonding layer (3'), said bonding layer (3') being identical or different from bonding layer (3).

31. The fuel storage or fuel transportation object according to claim 30, wherein the structure comprises from the outside to the inside the following layers: (2)//(3')//(4)//(3)//(1), layer (1) being in contact with the fluid.

32. The fuel storage or fuel transportation object according to claim 1, wherein said object is selected from the group consisting of bottles, tanks, containers, tubing and vessels.

33. The fuel storage or fuel transportation object according to claim 1, wherein the at least one layer (1) has a CE85 permeability less than 2 g·mm/m$^2$·24 h, said permeability being determined by injecting the copolyamide, at an injection temperature equal to Tm+20° C., onto a mold heated to 100° C. to form a plate, wherein said plate, not entirely crystallized, is then annealed for 2 hours under vacuum, at an annealing temperature of Tg+30° C., and later subjected to a gravimetric method at 60° C., said gravimetric method comprising exposing the annealed plate to a mixture of isooctane/toluene/ethanol in a 7.5/7.5/85 vol % ratio.

* * * * *